(12) United States Patent
Shonewille et al.

(10) Patent No.: US 6,379,426 B1
(45) Date of Patent: Apr. 30, 2002

(54) FLUIDIZED BED REDUCTION OF LATERITE FINES WITH REDUCING GASES GENERATED IN SITU

(75) Inventors: Ron Shonewille, Town Hanmer; Gary Kaiura, Aurora; Terrence Koehler, Mississauga, all of (CA)

(73) Assignee: Falconbridge Limited (CA)

( * ) Notice: Subject to any disclaimer, the term of this patent is extended or adjusted under 35 U.S.C. 154(b) by 0 days.

(21) Appl. No.: 09/658,461

(22) Filed: Sep. 8, 2000

Related U.S. Application Data

(63) Continuation of application No. 09/299,080, filed on Apr. 26, 1999, now abandoned.

(51) Int. Cl.$^7$ ................................................ C22B 23/02
(52) U.S. Cl. ........................... 75/629; 75/448; 75/483; 423/148
(58) Field of Search ................................ 423/148; 75/629, 75/448, 483

(56) References Cited

U.S. PATENT DOCUMENTS

| | | | | |
|---|---|---|---|---|
| 3,503,735 A | * | 3/1970 | Beggs et al. .................. | 75/629 |
| 4,070,181 A | | 1/1978 | Widell ............................ | 75/91 |
| 4,224,056 A | | 9/1980 | Tomizawa et al. ............. | 75/11 |
| 4,642,133 A | * | 2/1987 | Makinen et al. ............... | 75/447 |
| 4,789,580 A | | 12/1988 | Hirsch et al. .................. | 423/49 |
| 5,445,667 A | | 8/1995 | Malmstöm .................... | 75/448 |
| 5,746,805 A | * | 5/1998 | Queneau et al. .............. | 75/446 |
| 5,919,281 A | * | 7/1999 | Park et al. ..................... | 75/450 |

FOREIGN PATENT DOCUMENTS

| | | |
|---|---|---|
| FR | 1025051 | 4/1953 |

OTHER PUBLICATIONS

"The Circulating Fluidized Bed As Reactor For Chemical And Metallurgical Processes", Dipl.ing. M. Hirsch, et al., Paper Presented At The First International Conference On Circulating Fluidized Beds, Halifax, Nova Scotia, Canada, Nov. 18–20, 1985.

\* cited by examiner

*Primary Examiner*—Roy King
*Assistant Examiner*—Tima McGuthry-Banks
(74) *Attorney, Agent, or Firm*—Katten, Muchin, Zavis

(57) ABSTRACT

The present invention is concerned with a method for the pre-reduction of laterite fines in a reactor, preferably a fluidized bed, with reducing gases generated in situ by adding a reducing agent such as a carbonaceous material in the fluidized bed chamber, fluidizing the bed with an oxidizing gas and maintaining the reactor at a temperature sufficiently high to partially combust the coal and generate a reducing atmosphere. The reactor bed discharge calcine product has a carbon content of about 0.1%, and the composite reactor product has a carbon content lower than 2.0%.

26 Claims, No Drawings

FLUIDIZED BED REDUCTION OF LATERITE FINES WITH REDUCING GASES GENERATED IN SITU

This is a continuation of application Ser. No. 09/299,080, filed Apr. 26, 1999 (abandoned).

FIELD OF THE INVENTION

The present invention relates to a method for the pre-reduction of laterite fines in a bubbling fluidized bed reactor with reducing gases generated in situ by adding a reducing agent such as a carbonaceous material in the fluidized bed chamber, fluidizing the bed with a sub-stoichiometric quantity of oxygen, and maintaining a temperature sufficiently high to partially combust the reductant and generate a reducing atmosphere.

BACKGROUND OF THE INVENTION

Laterite ores used as a starting material for the production of nickel from smelting operations typically contain a significant fraction of particles greater than 10 cm in diameter as well as a significant fraction of particles less than 45 $\mu$m in diameter. Dealing with such a wide size distribution is a complicated and troublesome task, and in spite of major efforts in attempting to overcome the difficulties associated therewith, conventional technologies like rotary kiln—electric furnace processing, are still compromised by the naturally occurring fines in the ore.

Pre-reduction is used in the pyrometallurgical treatment of nickel laterite ores to reduce the load placed on the nickel smelting furnace. This pre-reduction operation is for the specific purpose of removing oxygen present in the ore to yield a separate nickel enriched metal phase after smelting. The operating conditions and the amount of reducing agent provided in the reactor will depend on the ferronickel grade required and the composition of the ore used as starting material. This can be accomplished upstream of the furnace while the ore is in the solid state, or alternately, directly in the furnace during smelting. Although pre-reduction represents an additional step in the nickel smelting operation, it is beneficial because it reduces the overall process energy cost, as well as the required furnace size, the required capacity of the furnace offgas system and the required power plant size.

Commercially, pre-reduction is typically in the range of 40 to 70% of the total reduction required to produce ferronickel. This usually includes reducing a substantial portion of the iron from the ferric state to the ferrous state, some of the nickel oxide to metallic nickel, and a minor amount of the ferrous iron to metallic iron.

In rotary kiln pre-reduction, reducing gases can be generated in situ with coal. However, this typically limits the extent of pre-reduction to about 40% unless extremely long residence times are utilized, or if the reduction is assisted with oil. In shaft furnace pre-reduction, oil is required as well as a dedicated external gasifier. The main constraint in using in situ gasification of coal is the carbon content of the product calcine. Currently, the carbon content of the calcine produced from existing commercial operations ranges from over 1% for oil fired shaft furnace and rotary kiln operations, to 3% for coal fired rotary kiln operations. Alternative technologies such as those developed for the direct production of iron by solid state reduction provides carbon levels from 3 to 10% in the product. The necessity for a low carbon content in the product calcine is determined by the carbon requirements of the downstream smelting furnace. If the carbon content of the calcine is too high, it will lead to excessive reduction in the smelting furnace, thus producing additional metallic iron and lowering the grade of the ferronickel product. The end result will be a ferronickel product that does not meet the product specification for nickel content. It is also well known that physical removal of carbon from the hot calcine to sufficiently low levels is not possible.

Traditionally, in fluidized bed pre-reduction processes, the reducing gas is generated externally from the fluidized bed reactor with the help of a dedicated gasifier. However, the concept of using the partial combustion of a carbonaceous material in a fluidized bed reactor for the in situ generation of reducing gases is also known, but little literature is available on specific experimental conditions and compound properties allowing optimal operation.

U.S. Pat. No. 5,445,667 is concerned with a process for the reduction of iron ore in solid phase in a fluidized bed reactor. An excess of carbon in the form of coke or coal is added in situ in addition to oxygen, and the temperature is maintained higher than 850° C. It would appear that the conditions used, i.e., the $CO/CO_2$ ratio are such that the product obtained contains mainly metallic iron or iron carbide. The particle size of the iron oxide is up to 1 mm, and the $CO/CO_2$ ratio is between 2.3 and 4.0. There is a reference to the fact that the method of this patent could be used to treat other materials containing iron oxide, but this statement is not supported by any experimental evidence whatsoever. In addition, the carbon content of the final calcine is not specified, and the physical properties of the coke or coal are not mentioned, suggested or implied. In addition, this process is based on the partial conversion of metallic iron to iron carbide in a separate reactor to inhibit sticking. The carbon content of iron carbide is 6.7%. This process also requires substantial preheating of the fluidizing air, preferably above 1000° C., or substitution of air with pure oxygen to enable sustaining the required operating temperature. Such a process cannot be applied to laterite containing materials because the extent of reduction is greater than that required for ferronickel production and an equivalent nickel carbide species does not exist.

U.S. Pat. No. 4,224,056 describes a process for the reduction of iron ore fines with a fluidized bed, wherein the ore is reduced simultaneously with the reducing gas production, i.e., generated in situ. The carbon-bearing particles are fluidized with the fluidizing gas to form a bed of carbon-bearing particles in the reactor. The iron ores can be in various forms, including dust. Iron appears to be present in the metallic form in the calcine. The separation of carbon from the reduced product is claimed to take place directly in the reactor as a result of the difference in particle densities. The efficiency of this separation is very questionable, since the literature contains many examples of the high degree of vertical mixing in a fluidized bed reactor. The patent also discusses the difficulty in maintaining the reactor temperature and suggests electrical heating and an external gasifier as means of achieving the system energy balance.

U.S. Pat. No. 4,070,181 discloses a method for the reduction of finely divided metal oxides like iron ores, the reduction being accomplished in a reactor with a large excess of carbonaceous material. In fact, the coal addition is approximately 50% that of the ore addition. Each component is supplied continuously in the reactor. The grain size of the iron oxide is lower than 1 mm and the grain size of the coal is lower than 3 mm. The carbonaceous material can also be a liquid, such as oil. The temperature is preferably maintained between 800 and 1100° C. in the reactor. The method can also be applied to the reduction of nickel oxide. The patent further states that the pre-reduced product containing coke proceeds to a final reduction stage. This reference is the basis of the first step in the Elred process that has been described in the literature, but was never commercialized. In fact, a paper authored by the inventor of the invention disclosed and claimed in U.S. Pat. No. 4,070,181 states that the carbon content of the partially pre-reduced calcine contains about 26% carbon based on pilot plant tests (see Widdell et al. in *Iron and Steelmaker*, October 1981, pp. 219–224).

Pahlman et al. in *Mining Review*, October 1976, pp. 16–20, discloses a fluidized bed reduction roasting process applied to taconites, wherein carbonaceous fuels are partially combusted to supply heat and reductant requirements. The fact that the carbonaceous fuels are only partly combusted means that the resulting calcine will have a significant carbon content, i.e., around 6%, as calculated by the present inventors. The particle size of the carbonaceous material used is minus 8 plus 28 mesh, or 2.4 to 0.6 mm. The work is specifically directed at a partial reduction of iron ore, with the objective of reducing hematite to magnetite that could be concentrated by wet magnetic separation. Such procedure does not provide reducing conditions strong enough to reduce hematite to wustite and nickel oxide to metal and would therefore only provide up to 20% pre-reduction if applied to laterites.

A paper from Hirsch et al. presented at the first international conference on Circulating Fluidized Beds in Halifax, Nova Scotia, Canada in November 1985, generally describes the fields of application of circulating fluidized beds in metallurgy. It is merely suggested in the paper that circulating fluidized beds can be used for the pre-reduction of lateritic nickel ores.

There is therefore a great need to develop an efficient method for the pre-reduction of lateritic ores that could overcome the drawbacks listed above and provide an optimized method. Such method should allow the production of calcine containing the lowest possible concentration of carbon to prevent excessive reduction in the subsequent smelting step, resulting in off-specification product ferronickel.

SUMMARY OF THE INVENTION

In accordance with the present invention, there is now provided a method for the pre-reduction of an iron oxide-containing material such as nickel laterite ore, preferably fines, in a reactor with reducing gases generated in situ by the partial combustion of a reducing agent to produce a reactor calcine product with a low carbon content and a high degree of pre-reduction, the method comprising the steps of:

injecting an oxidizing gas into a chamber of the reactor, and feeding the iron oxide-containing material and a reducing agent;

maintaining a temperature inside the chamber sufficiently high to partially combust the reducing agent and provide a reducing atmosphere to convert $Fe_2O_3$ to $FeO$; and recovering the reduced calcine product.

Preferably, the reducing agent has a particle size of from substantially 20 $\mu$m to substantially 400 $\mu$m. The oxidizing gas is preferably air, oxygen-enriched air, oxygen, $CO_2$, steam, and mixtures thereof, air being the most preferred gas for obvious economic reasons.

DETAILED DESCRIPTION OF THE INVENTION

The present invention is directed to a method for reduction of laterite fines in a reactor, preferably a bubbling fluidized bed, with reducing gases generated in situ by the partial combustion of carbonaceous materials like sub-bituminous coal. Although only partial combustion of the reducing agent occurs, the low content thereof in the calcine product is due to the subsequent gasification and reduction mechanisms taking place during the process. Solid carbon reacts with $CO_2$ gas to generate $CO$, which in turn reduces iron and nickel oxides and regenerates $CO_2$, which then reacts with solid carbon, and so on.

The present method is particularly useful since it avoids the necessity of an external dedicated gasifier for generating carbon monoxide and hydrogen gases used in fluidized bed technology and permits the use of low cost reducing agents. The reduction and oxidation operations are therefore combined in a single reactor. When operating within the conditions according to the present method, it has been found that the bed discharge product, which represents the majority of the product, is essentially carbon free, i.e. it contains about 0.1% by weight of carbon. This is particularly advantageous because there is no excess carbon in the smelting furnace feed and enables the production of a wider range of product ferronickel grades, such as those with higher grades. Further, the offgas is very close to equilibrium with the calcine product, thus allowing minimum reducing agent addition to the pre-reduction vessel, minimum residual carbon in calcine and minimum fuel value/volume in the offgas for recycling to the upstream calcination process. The offgas $CO/CO_2$ ratio can be between 0.3 and 2.0, although, it is preferred to operate as close as possible to the equilibrium value of 0.3. A most preferred range of operation would be between 0.3 and 0.75. With such conditions, most of the iron in the calcine is in the form of wustite.

As the present new method for pre-reduction of laterite ore is preferably fines-based, the feed to the pre-reduction vessel may come from a fluidized bed calciner, and the product may be smelted in an electric arc furnace. The novel feature of the present method for laterite pre-reduction is the generation of reducing gases in situ through the partial combustion, or gasification, under specific conditions with a carbonaceous material having specific physical properties.

To achieve such unexpected results, parameters such as operating temperature, free space velocity, the volatility of the reducing agent, the reactivity of the reducing agent and its particle size must be tightly controlled to produce a reactor bed discharge calcine product containing about 0.1% by weight of carbon, and containing most of the iron in the form of wustite.

Examples of reactors suitable for the purpose of the present method include a bubbling fluidized bed, a circulating fluidized bed, a flash reactor or a multiple hearth furnace, the bubbling fluidized bed being the most preferred. These reactors may be combined to other devices, such as cyclones, to collect whatever calcine material is blown out from the top of the reactor. The carbon content of such calcine material is generally around 2%. This material can be recycled to the reactor, or combined with the reactor discharge product, as long as the final carbon content of the combined material does not exceed the carbon requirements of the smelting vessel, typically between 1.0 and 1.5%.

Preferred Parameters for the Reagent and Operating Conditions

The reducing agent particle size is preferably in the range of about 20 to about 400 $\mu$m. The iron oxide-containing material particle size is preferably between 10 and 1500 $\mu$m. The volatility of the reducing agent is characterized by the volatile matter content of the coal, which is a measure of the quantity of hydrocarbons evolved upon heating the coal in an inert atmosphere. This characterization is carried out under conventional standard chemical methods well known in the field by anyone of ordinary skill in the art. As it will be seen in the examples below, a volatile matter content of 45% in the coal represents a most preferred embodiment. The coal volatility is preferably at least 25%, and there is no upper limit, although it is well known in the field that coal volatility seldom exceeds 50%. Also, the char resulting from the coal used should have a high reactivity towards $CO_2$, preferably greater than 0.5%/min at 900° C. In the examples provided herein below, the coal tested in the pilot program had a char reactivity of 1.1%/min. However, a combination of a higher char reactivity/lower coal volatility or vice versa will suit the process, as both of these parameters determine the residual carbon content of the calcine.

The temperature should be high enough to allow partial combustion and gasification of the reducing agent, and reduction of the calcine, but not too high to prevent defluidization due to calcine sticking. Typically, the temperature is kept between about 800 ° C. and about 1100° C. This is achieved by adequate preheating of the calcine feed material.

The free-space velocity (fsv) must be such that the residence time of the coal and the calcine inside the reactor is sufficient to ensure near complete conversion of $Fe_2O_3$ to FeO. The free-space velocity must therefore be sufficient to fully fluidize the bed, while not too high to ensure sufficient residence time for the fine particles prior to elutriation. Typically, the free-space velocity varies between 0.35 and 0.60 m/s.

In a preferred embodiment, a carbonaceous material like coal, lignite, natural gas, fuel oil and coal char are used as reducing agents, sub-bituminous coal being the most preferred.

Although the present method is particularly advantageous for sapprolitic nickel laterite, the method can be applied to other iron oxide-containing feed materials, such as limonitic laterites, roasted sulphide concentrates (i.e. Ni, Cu, Pb, Zn, PGM, etc.), iron ore, chrome ore, titanium oxide ore, or mixtures thereof. The operating conditions for these other materials vary depending on the specific sticking temperature of the feed material. Further, the reducing agent/ore ratio and oxidizing gas/ore ratio are also a function of the chemical content of the feed material.

The following examples are provided to illustrate the present invention, and shall not be construed as limiting its scope.

reactor was used for the tests. The test program included 8 individual sets of operating conditions. The feed material was nickel laterite ore, mainly sapprolite, previously milled in a semi-autogenous grinding (SAG) mill and calcined in a circulating fluidized bed reactor. The chemical and size analysis of the calcine feed to be pre-reduced is given in Table 1 below.

TABLE 1

Chemical and size analysis of the feed material to be pre-reduced

| Calcine feed chemical analysis (dry wt %) | Calcine feed particle size analysis (cumulative) |
|---|---|
| 3% NiO | 99% < 500 μm |
| 30% $Fe_2O_3$ | 90% < 200 μm |
| 42% $SiO_2$ | 75% < 150 μm |
| 20% MgO | 55% < 100 μm |
| 5% others | 45% < 75 μm |
| <0.2% crystalline water | 28% < 45 μm |

The reducing agent used was a high volatile matter sub-bituminous coal containing about 6% moisture.

The operating parameters in the fluidized bed were:

temperature of 900° C.;

as stated above, the maximum ore size is 500 μm, (maximum 1200 μm for Test 6);

the coal used is sub-bituminous coal (45% volatile matter);

the mean coal particle size is about 75 μm (20 μm for Test 2 and 200 μm for Test 3);

the free space velocity is 0.5 ms, (0.6 for Tests 7 and 8);

the bed depth is 1.8 m (1.2 m for Test 4);

air/coal ratio is about 10% of the stoichiometric air requirement for complete combustion.

The results obtained under these conditions appear in Table 2 below.

TABLE 2

Results of pilot scale experiments

| Test # | Solid residence time (min) | Calcine feedrate (kg/hr) | Coal addition (% on calcine) | Air flowrate (NL/hr) | $Fe_2O_3$ to $Fe_3O_4$ (%) | $Fe_2O_3$ to FeO (%) | NiO to Ni (%) | Total pre-reduction (%) | Offgas $CO/CO_2$ (v/v) | C in calcine (%) |
|---|---|---|---|---|---|---|---|---|---|---|
| 1 | 16 | 61 | 3.1 | 1.78 | 6 | 94 | 38 | 65 | 0.67 | 0.86 |
| 2 | 17 | 61 | 3.1 | 1.78 | 21 | 79 | 17 | 57 | 0.74 | 0.85 |
| 3 | 17 | 61 | 3.1 | 1.78 | 10 | 90 | 29 | 64 | 0.79 | 0.85 |
| 4 | 13 | 61 | 3.1 | 1.78 | 16 | 84 | 32 | 62 | 0.63 | 0.95 |
| 5 | 27 | 55 | 3.4 | 1.74 | 13 | 87 | 31 | 57 | 0.63 | 0.98 |
| 6 | 19 | 61 | 3.1 | 1.78 | 12 | 88 | 23 | 64 | 0.57 | 0.89 |
| 7 | 27 | 66 | 3.4 | 2.09 | 17 | 83 | 24 | 57 | 0.50 | 0.84 |
| 8 | 18 | 73 | 3.1 | 2.14 | 30 | 70 | 25 | 59 | 0.48 | 0.94 |

Pilot Scale Testing

Pilot scale experiments were conducted under various experimental conditions. A 15 cm diameter continuously fed In a commercial method, this offgas can be used as fuel in the upstream calcination method. The bed product and cyclone underflow are similar with respect to the degree of reduction of the calcine. However, as outlined above, the bed discharge product contains substantially less carbon. Very little particle decrepitation took place during the reduction, and the product calcine size analysis is similar to the feed size analysis given above.

While the invention has been described in connection with specific embodiments thereof, it will be understood that it is capable of further modifications and this application is intended to cover any variations, uses or adaptations of the invention following, in general, the principles of the invention and including such departures from the present description as come within known or customary practice within the art to which the invention pertains, and as may be applied to the essential features hereinbefore set forth, and as follows in the scope of the appended claims.

What is claimed is:

1. A method for the reduction of iron oxide-containing materials in a reactor to produce a low carbon calcine product, the method comprising the steps of:

injecting an oxidizing gas into a chamber of the reactor, and feeding the iron oxide-containing material and a reducing agent;

maintaining a temperature inside the chamber sufficiently high to partially combust the reducing agent to provide a reducing atmosphere to convert $Fe_2O_3$ to $FeO$;

recovering the reduced calcine product, wherein the carbon content of the reduced calcine product is maintained between 0.1 and 2.0 percent by weight; and producing a reactor discharge which has a carbon content less than about 1.5% by weight.

2. A method according to claim 1 wherein the reactor comprises a bubbling fluidized bed, a circulating fluidized bed, a flash reactor, or a multiple hearth furnace.

3. A method according to claim 1 wherein the reducing agent comprises a carbonaceous material.

4. A method according to claim 3 wherein the carbonaceous material comprises coal, lignite, natural gas, fuel oil, coal char, coke or mixtures thereof.

5. A method according to claim 3 wherein the temperature is maintained above the gasification temperature of the carbonaceous material but below the sticking temperature of the reduced calcine product.

6. A method according to claim 1 wherein the $CO/CO_2$ ratio inside the chamber is maintained between 0.3 and 2.0 by adding the reducing agent.

7. A method according to claim 1 wherein the oxidizing gas comprises air, oxygen-enriched air, oxygen, $CO_2$, steam, or mixtures thereof.

8. A method according to claim 1 wherein the method is carried out in a bubbling fluidized bed in continuous manner under a free-space velocity sufficient to fluidize the bed.

9. A method according to claim 8 wherein the free-space velocity is comprised between substantially 0.35 to substantially 0.60 m/s.

10. A method according to claim 1 wherein the iron oxide-containing material comprises sapprolitic nickel laterite, limonitic laterites, roasted sulphide concentrates, iron ore, chrome ore, titanium oxide ore, or mixtures thereof.

11. A method according to claim 1 wherein the reactor discharge has a carbon content of substantially 0.1% by weight.

12. A method according to claim 1, wherein the free space velocity in the reactor chamber is maintained at about 0.5 m/s.

13. A method for the reduction of iron oxide-containing materials in a reactor to produce a low carbon calcine product, the method comprising the steps of:

injecting an oxidizing gas into a chamber of the reactor, and feeding the iron oxide-containing material and a reducing agent;

maintaining a temperature inside the chamber sufficiently high to partially combust the reducing agent to provide a reducing atmosphere to convert $Fe_2O_3$ to $FeO$, wherein the temperature is maintained between at least 800° C. and not more than 1100° C.;

recovering the reduced calcine product; and producing a reactor discharge which has a carbon content less than about 1.5% by weight.

14. A method for the reduction of iron oxide-containing materials in a reactor to produce a low carbon calcine product, the method comprising the steps of:

injecting an oxidizing gas into a chamber of the reactor, and feeding the iron oxide-containing material and a reducing agent, wherein the reducing agent possesses a sufficient combination of volatility, reactivity and fineness of particle size to promote substantial gasification thereof;

maintaining a temperature inside the chamber sufficiently high to partially combust the reducing agent to provide a reducing atmosphere to convert $Fe_2O_3$ to $FeO$;

recovering the reduced calcine product; and producing a reactor discharge which has a carbon content less than about 1.5% by weight.

15. A method according to claim 14 wherein the particle size ranges from substantially 20 to substantially 400 µm.

16. A method for the reduction of nickel laterite in a fluidized bed reactor to produce a low carbon calcine product, the method comprising the steps of:

injecting air as an oxidizing fluidizing gas in a fluidizing chamber of the reactor, and feeding the nickel laterite and a carbonaceous material, the carbonaceous material having a particle size of from substantially 20 to substantially 400 µm and a volatility content of at least about 25%;

maintaining a temperature inside the chamber between 800 and 1100° C. to partially combust the carbonaceous material to provide a reducing atmosphere to convert $Fe_2O_3$ to $FeO$ and $NiO$ to metallic $Ni$;

recovering the reduced bed discharge calcine product; and producing a reactor discharge which has a carbon content less than about 1.5% by weight.

17. A method according to claim 16 wherein the reactor discharge has a carbon content of substantially 0.1% by weight.

18. A method according to claim 16, wherein the carbonaceous material has a volatility content of about 45%.

19. A method according to claim 16 wherein the fluidized bed reactor comprises a bubbling fluidized bed.

20. A method according to claim 16 wherein the carbonaceous material comprises sub-bituminous coal.

21. A method according to claim 20 wherein the $CO/CO_2$ ratio inside the chamber is maintained between 0.3 and 2.0 by adding the sub-bituminous coal.

22. A method according to claim 16 wherein the method is carried out in a continuous manner under a free-space velocity of from substantially 0.35 to substantially 0.60 m/s.

23. A method for the reduction of iron oxide-containing materials in a reactor to produce a low carbon calcine product, the method comprising the steps of:

injecting an oxidizing gas into a chamber of the reactor, and feeding the iron oxide-containing material and a reducing agent;

maintaining a temperature inside the chamber between at least 800° C. and not more than 1100° C. to partially combust the reducing agent to provide a reducing atmosphere to convert $Fe_2O_3$ to FeO;

recovering the reduced calcine product, wherein the carbon content of the reduced calcine product is maintained between 0.1 and 2.0 percent by weight;

maintaining the reactor offgas $CO/CO_2$ ratio to between substantially 0.3 and 2.0; and producing a reactor discharge which has a carbon content less than about 1.5% by weight.

24. A method according to claim 23, wherein the free space velocity in the reactor chamber is maintained at about 0.5 m/s.

25. A method for the reduction of nickel laterite in a fluidized bed reactor to produce a low carbon calcine product, the method comprising the steps of:

injecting air as an oxidizing fluidizing gas in a fluidizing chamber of the reactor, and feeding the nickel laterite and a carbonaceous material, the carbonaceous material having a particle size of from substantially 20 to substantially 400 μm and a volatility content of at least about 25%;

maintaining a temperature inside the chamber between 800 and 1100° C. to partially combust the carbonaceous material to provide a reducing atmosphere to convert $Fe_2O_3$ to FeO and NiO to metallic Ni;

recovering the reduced bed discharge calcine product;

maintaining the reactor offgas $CO/CO_2$ ratio to between substantially 0.3 and 2.0; and producing a reactor discharge which has a carbon content less than about 1.5% by weight.

26. A method according to claim 25, wherein the carbonaceous material has a volatility content of about 45%.

* * * * *